July 12, 1966   H. R. DOLF ETAL   3,260,587
METHOD OF MELTING GLASS WITH SUBMERGED COMBUSTION
HEATERS AND APPARATUS THEREFOR
Filed Dec. 5, 1962

INVENTORS.
HANS R. DOLF
WILLIAM E. MARCEAU
BY
ATTORNEY.

INVENTORS.
HANS R. DOLF
WILLIAM E. MARCEAU
BY E. Welford Mason
ATTORNEY.

United States Patent Office 3,260,587
Patented July 12, 1966

3,260,587
METHOD OF MELTING GLASS WITH SUBMERGED COMBUSTION HEATERS AND APPARATUS THEREFOR
Hans R. Dolf, Wayne, and William E. Marceau, Havertown, Pa., assignors to Selas Corporation of America, Dresher, Pa., a corporation of Pennsylvania
Filed Dec. 5, 1962, Ser. No. 242,515
12 Claims. (Cl. 65—135)

The present invention relates to the melting of glass or similar materials, and more particularly to the use of submerged combustion for this purpose.

Ordinarily glass batch and cullet are placed in a glass furnace and melted by heat developed by firing across the top of the glass. As the glass is melted it flows from a melting zone to a fining zone, and from there to the point of discharge. These furnaces are large and relatively inefficient.

It is an object of the invention to provide a method of melting glass by the introduction of hot products of combustion directly into the glass below the surface thereof.

It is a further object of the invention to provide an efficient method of melting glass by which a relatively large volume of glass can be melted in a small area.

A further object of the invention is to provide an improved burner that is particularly adapted to be used to introduce hot products of combustion below the surface of glass in a glass melting furnace. The burner can be mounted either in the floor or the side wall of the furnace so that the combustion products are directed through the glass to heat it and create a homogenous mixture of the ingredients.

In practicing the invention, a burner having an air cooled casing is inserted in the furnace wall. This burner has in it provisions for mixing fuel gas and air, burning them, and discharging the products of combustion at high temperature and velocity into the glass. The hot gases agitate the glass and impart a high percentage of their heat thereto, thus melting the glass rapidly. The feed for such a furnace can be either cullet or batch, or a mixture of the two. The raw material is fed to the melter near or under the surface of the glass in a location where it will be drawn into the glass and circulated therewith by currents resulting from the hot gases, thereby to be rapidly melted. After the glass is melted it flows from the melting zone to a separate fining zone and from there to a point of use.

The various features of novelty which characterize our invention are pointed out with particularity in the claims annexed to and from a part of this specification. For a better understanding of the invention, however, its advantages and specific objects attained with its use, reference should be had to the accompanying drawings and descriptive matter in which we have illustrated and described a preferred embodiment of the invention.

Figure 1:
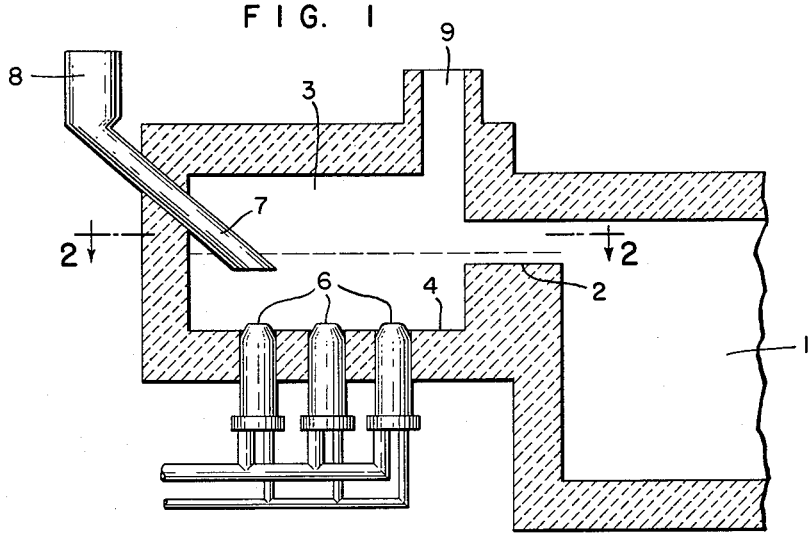
FIG. 1 is a section through apparatus in which glass is melted and refined.
Figure 2:
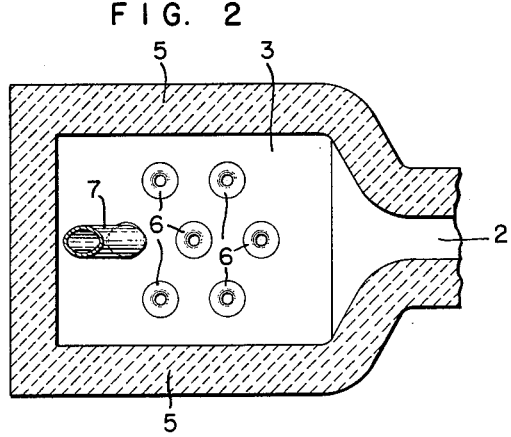
FIG. 2 is a view taken on line 2—2 of FIG. 1.

Referring to FIG. 1, there is shown the fining section of a glass furnace 1 through which the glass moves to a forehearth and a point of use. Liquid glass is supplied to this section over a weir 2 from a melting chamber or zone 3 in which the glass in the form of batch or cullet is melted. The melting is accomplished by burners 6 which are completely submerged under the liquid glass, and are mounted in the furnace by extending through openings provided for this purpose in the floor 4 of the furnace. Raw materials for making the glass are supplied through a spout 7, the lower end of which is located between a pair of the burners in a manner to be described more particularly below and at a level immediately above or slightly below the normal liquid level of the glass in the furnace. The raw material is supplied to this spout from a hopper 8 with normal control of the supply, and the products of combustion from the burners which rise through the glass are discharged from the chamber 3 through a flue 9.

Figure 3:
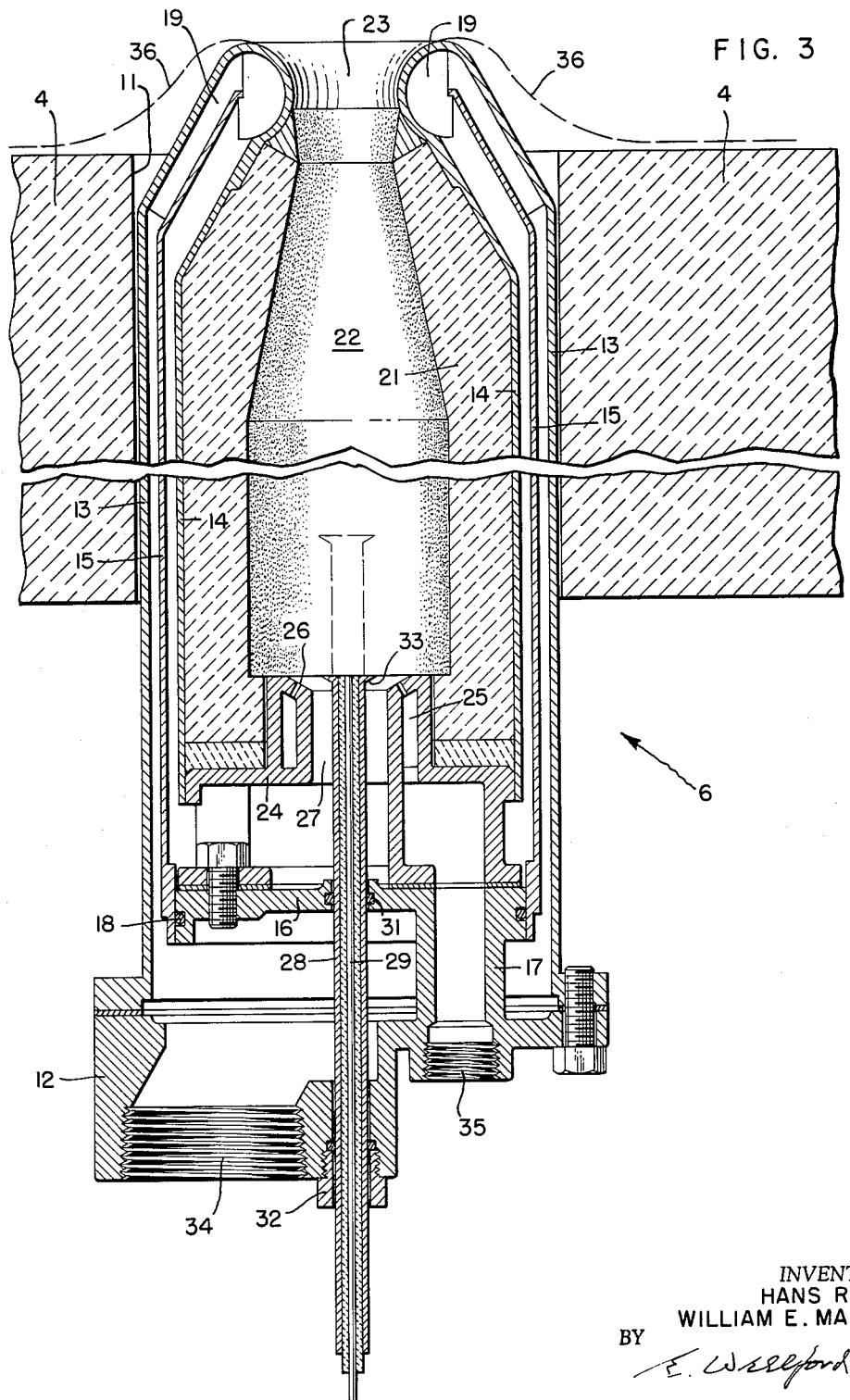
FIG. 3 is a section through the burner showing it mounted in the furnace floor.

An important feature of the invention is the construction of the burners 6 which permit them to be located in the floor of the melting zone and beneath the level of the glass. A section through one of these burners is shown in FIG. 3. Referring to that figure, it will be seen that the burner extends through an opening 11 in the floor with the end of the burner projecting a short distance into the chamber. This burner comprises a base casting 12 that is mounted on some suitable support so that the burner is properly located in opening 11. Attached to the casting is a double wall casing consisting of an outer wall 13 that is received snugly in the opening 11 and an inner wall 14. It will be noted that the upper end of this casing is constricted inwardly from its normal cylindrical shape so that there is a small space left between the upper end of the opening 11 and the outer surface of wall 13. The space between the walls 13 and 14 is divided into two annular passages by a partition 15 which is supported on a disc 16 formed as part of casting 12, and connected to the lower part of this casting by means of a column 17 forming a portion of the gas passage. Partition 15 fits snugly on the periphery of disc 16, and is sealed with respect to this disc by means of a seal 18. The upper end of the partition is accurately positioned between walls 13 and 14 by means of a plurality of radially extending fins 19 which extend inwardly from wall 13 and around the edge thereof. Inner wall 14 is lined with a refractory 21 to form a combustion chamber having a restricted discharge opening 23 at the end of the casing. Fuel and air are supplied to the combustion chamber through a part 24 which is attached to disc 16. This part includes an annular gas chamber 25 having discharge ports 26 that are directed inwardly toward a point at substantially the center of the chamber. This part also has a central air passage 27 through which air for combustion flows to be mixed with the gas coming through ports 26.

Ignition of the mixture in the combustion chamber is obtained by a spark which is discharged across electrodes in an ignition rod. This rod includes a sleeve 28 forming the outer electrode which receives and is insulated from a center electrode 29 in the form of a wire. The ignition rod is slidable from the full line position shown to the dotted line position through guides that include a seal 31 in the disc 16 and a stuffing box 32 in the rear end of casting 12. It is noted that the outer electrode flares as shown at 33 to direct the air flowing through passage 27 across the jets of gas flowing through passages 26.

An air port 34 is formed in the casting 12 with the air flowing into this port and the casting through the annular path between wall 13 and partition 15, around the end of the partition, and back between wall 14 and the partition to the space above disc 16 which leads directly to air passage 27. The casting 12 is provided with a gas passage 35 extending through column 17 directly to the annulus 25. If desired, cooling water can be used instead of air. In such a case provision would be made for the discharge of water from the burner, and the combustion air would flow directly from an opening in casting 12 to passage 27.

In operating the system gas and air are supplied to the burners in preselected proportions, which are slightly lean, for the gas being used by any conventional ratio controller. With the igniting rod in its dotted line position of FIG. 3, a spark is jumped across the electrodes to ignite the mixture and the rod is withdrawn to its normal operating position. In this position the flaring end 33 of the rod directs the air across the jets of fuel issuing from ports 26 so that good mixing takes place. Burning of the fuel is completed within the combustion chamber, and hence the burner may be called a combustion chamber type burner. Burning fuel in the chamber heats the wall 22 thereof to incandescence, which helps to maintain combustion and increase the capacity of the burner. As the burner heats up the air will be preheated while at the same time cooling the metal parts sufficiently to insure a long life. Fins 19 extract enough heat from the end of the burner so that it is kept below a temperature at which the metal can be attacked by the molten glass.

The hot products of combustion issuing at high velocity from discharge port 23 are directed into melting chamber 3 to heat the chamber and the parts adjacent thereto. When the furnace has been brought up to temperature, raw material, preferably initially in the form of cullet, is introduced through spout 7, and as it begins to cover the burners is melted by the gases issuing from them. The level of the glass can vary between wide limits and may be two or three feet above the burner discharge ports. What ever the level, the pressure of the fuel and air supplies must be sufficient to overcome the head of glass.

As the products of combustion flow up through the glass, they disperse and weave around rather than form vertical openings directly to the surface. This action produces currents in the glass with the hottest portions, adjacent to the burners, rising and cooler portions, adjacent to the walls and between the burners, moving down, with a general current in the direction of weir 2. Thus, in addition to being melted, the glass is thoroughly mixed to a uniform mass. The feed of batch and cullet is introduced at a relatively cooler location, between burners, so that it is first drawn downwardly and mixed with the liquid glass as it begins to melt. Introduction of the raw material at a location where the current of the material is downward insures immediate mixing. If the raw material is granular it can be dropped on the surface of the molten mass from a point closely adjacent to the surface. If, however, the raw material is a powder or has powder in it, the raw material should be introduced into the molten mass below the surface, as shown in FIG. 1, so that the products of combustion will not blow the powder around the chamber and against the furnace walls. Since the burners are spaced from walls 5, the glass adjacent to the walls is cooler and more viscous than that at the center of the chamber. Therefore, there is less or slower flow of the glass along the wall.

The glass in contact with the shell of the burner is cooled sufficiently by heat transfer through the wall thereof to the combustion air to freeze. Thus, there is a thin layer of solid glass, as shown by line 36 in FIG. 3, in contact with the burner around opening 11. This serves the purpose of insulating and protecting the burner tips from wear as well as filling the space between the opening and burner to prevent leakage.

Movement of the gases up through the glass will have a tendency to produce bubbles. Since at this time the glass is hot and of low viscosity, the bubbles will readily rise to the surface and burst. Those which do not rise in chamber 3 will be carried with the glass in a thin layer over weir 2 where they will rise. Any bubbles remaining in the glass will flow into fining tank or chamber 1 where sufficient time is provided for the glass to be refined before being drawn off for use.

The gas and air will be supplied to the burner at a pressure of approximately one pound per square inch for each foot of glass depth in melting chamber 3 plus the pressure drop through the system. With an operation of this type complete combustion of the fuel takes place in combustion chamber 22, so that only hot products of combustion at a temperature of approximately 3000° F. are discharged into the glass to melt the glass and keep it at a suitable temperature and viscosity, which will be about 2200° F., for soda lime glass, for example. The gases resulting from complete combustion of the fuel will not produce any discoloration of the glass. It is preferred to have the glass at no greater depth than is required to have the gases leave the glass at about the temperature of the glass, which makes very efficient heating and reduces the pressure requirements for the fuel and air.

The flow of combustion air through the burner casing is sufficient to keep this casing at a temperature between 950° F. and 1000° F., which is low enough for the burner to have an indefinite life. The temperature of the outer portion of the casing, which is above the level of the floor 4 and in the glass, is below the freezing point of glass so that the thin layer of solid glass, shown at 36, acts to protect and insulate the burner. It is noted that the combustion air, which serves to cool the burner tip, is preheated to about 400° F., thus increasing the efficiency of the apparatus. The number and size of burners required will, of course, depend upon the size of the melting chamber and its capacity. This can easily be calculated by one skilled in the art. A melting tank of this type can melt a ton of glass per day for each half square foot of area. It has been found that burners having a capacity range of from 250,000 to 750,000 B.t.u. per hour are of a convenient size for a melter having a capacity of approximately 30 tons per day.

Figure 4:
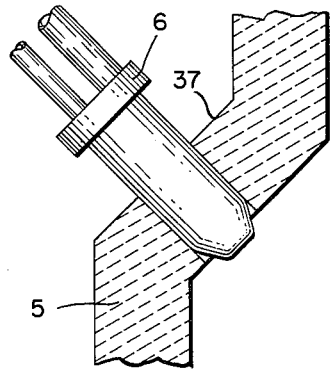
FIG. 4 is a section showing another way of mounting the burner in the furnace.

In the above description the burners were shown as extending upwardly through the floor of the melting chamber. The burners may also be placed in the side walls of the chamber, however, if the combustion gases are properly directed. Such an arrangement is shown in FIG. 4, in which the wall 5 of the melting chamber has a portion 37 slanted inwardly. A burner 6 is shown extending perpendicularly through wall portion 37 and about 45° to the horizontal. In this position the products of combustion are forced downwardly away from the wall and then they move upwardly through the glass. The melting process is the same.

When it is desired to shut down the melting, gas to the burners is cut off while air continues to flow. In this way passages are retained throughout the glass so that the products of combustion can be discharged when the burners are relighted. Also, liquid glass will be prevented from flowing into the burners.

From the above it will be seen that we have developed an efficient method of melting glass and one in which the heat is released directly in the glass rather than indirectly, as is usual. The burner that is used in the apparatus is especially adapted for this purpose and contributes toward the efficient operation of the method. It will be obvious that the method of melting can be used for melting various chemicals or salts in granular or powdered form, and the claims should be so construed.

While in accordance with the provisions of the statutes, we have illustrated and described the best form of embodiment of our invention now known to us, it will be apparent to those skilled in the art that changes may be made in the form of the apparatus disclosed without departing from the spirit and scope of the invention set forth in the appended claims, and that in some cases certain features of our invention may be used to advantage without a corresponding use of other features.

What is claimed is:
1. Apparatus for melting glass including a melting tank having a floor and side walls, said floor being provided with a plurality of spaced openings, a burner received in each opening with the end of each burner pro- jecting above the level of the floor, each burner including a combustion chamber with a discharge opening, said opening terminating in the end portion of the burner projecting above said floor, means to supply gas and air to said burner to be burned in said combustion chamber, means to direct the supply of air to the combustion chamber through said projecting end portion to cool the portion of the burner projecting above said floor, the products of combustion resulting from the burning of the gas and air passing through said opening into said tank, and supply means for material to be melted extending into said tank and terminating at a level adjacent to the intended level of glass therein.

2. A combustion chamber type burner for use in the melting of glass and the like including structure forming a combustion chamber having an inlet end and a restricted discharge opening, a hollow casing surrounding said chamber, means to supply gas to said inlet end in a plurality of jets arranged in a circle and directed toward a point at substantially the center of said chamber, means to supply air to the inlet end of said chamber in a direction to cross said jets of gas, and means to circulate the air through said casing on its way to said chamber.

3. The combination of claim 2 in which said means to supply air includes an ignition electrode, and means to mount said electrode for movement from an air directing position in said inlet end to a position at substantially the center of said combustion chamber.

4. The method of melting glass in a furnace having a bottom and side walls, which comprises introducing products of combustion at a temperature above the melting point of glass and at a pressure sufficiently high to create currents in the glass and rise to the surface thereof through the floor of the furnace into the glass at a plurality of spaced points that are spaced from the walls of the furnace, agitating the glass by said products of combustion as they rise to mix it thoroughly, and circulating a cooling medium in heat exchange relation with the glass immediately adjacent to the points at which said products of combustion are introduced so that the glass around said points is substantially solid and will flow very little, if at all.

5. The method of claim 4 in which the raw materials used to form the melted glass are introduced into the glass below its surface, and substantially between a pair of said points.

6. The combination of a furnace having a floor and side walls, said floor being provided with a plurality of openings spaced from each other and from said side walls, a plurality of combustion chamber type burners of a size to be received in said openings, a burner being in each opening, each burner being of a length greater than the thickness of said floor and having a discharge end, means to hold said burners in said openings with the discharge ends thereof projecting slightly above said floor, each burner being provided around its surface and discharge end with a passage through which a cooling fluid is to be circulated to cool the portion of said floor surrounding said burners and the material in the furnace engaging said discharge ends, and means through which a cooling fluid is circulated through said passage.

7. Apparatus for melting glass or like material including a furnace chamber having a floor and side walls in which the material is contained, said floor having a plurality of openings therein spaced from each other and from said side walls, a combustion chamber type burner inserted in each opening and projecting into the chamber above the floor level, each of said burners being provided with a discharge passage through which hot products of combustion are discharged into and through material in said chamber, and means to supply material to be melted to said chamber between a pair of said burners and below the level of the material therein.

8. A burner adapted for submerged combustion comprising a cylindrical casing having spaced walls, said casing having a first open end and a second end that is constricted in diameter to form a discharge port, a ceramic lining within said casing to form a combustion chamber, means forming an annular chamber received within the lining at said first end of said casing, said means having ports extending from said annular chamber into said combustion chamber with said ports converging toward a point substantially axially of said combustion chamber, means to supply gas to said annular chamber, a base for said burner attached to said first end of said casing, means to supply combustion air to said base, means to direct air from said base between the spaced walls of said casing and into said combustion chamber through the center of said annular chamber, and means in said combustion chamber to ignite the gas and air supplied thereto.

9. The burner of claim 8 in which said means to ignite includes a pair of concentric electrodes, one end of the outer electrode being enlarged, said electrodes being mounted in said base for sliding movement from a position in which said enlargement is substantially aligned with and concentric with said ports to a position in which said enlargement is in substantially the center of said combustion chamber.

10. The burner of claim 8 including a partition between the walls of said casing, said means to direct air including means to guide air lengthwise of said casing around said partition as it flows from said base to the center of said annular chamber.

11. The burner of claim 8 including heat exchange fins between the walls of said casing at said constricted end around said discharge port.

12. The method of melting a normally solid material in a chamber having side walls and a floor which comprises forcing hot products of combustion at a temperature above the melting point of the material upwardly through the material at a pressure sufficient to create vertically moving currents in the material from a plurality of locations in the floor of the chamber spaced from each other and from the side walls, said products of combustion creating substantially vertically moving currents in the body of material being melted with the currents moving upwardly above said locations and downwardly between them, and introducing solid material to be melted into the material under the surface thereof at a location where the body of material is moving downwardly whereby to mix said solid material thoroughly with the body of material to speed the melting thereof.

References Cited by the Examiner
UNITED STATES PATENTS

| | | | |
|---|---|---|---|
| 1,611,328 | 12/1926 | Arbogast | 65—134 |
| 1,905,534 | 4/1933 | Wadman | 65—335 X |
| 1,994,968 | 3/1935 | Sloyan | 158—76 X |
| 2,634,555 | 4/1953 | Henry et al. | 65—135 |

DONALL H. SYLVESTER, *Primary Examiner.*

A. D. KELLOGG, *Assistant Examiner.*